United States Patent [19]

Doi et al.

[11] Patent Number: 5,526,509

[45] Date of Patent: * Jun. 11, 1996

[54] METHOD AND APPARATUS FOR CONTROLLING ONE OR MORE HIERARCHICAL MEMORIES USING A VIRTUAL STORAGE SCHEME AND PHYSICAL TO VIRTUAL ADDRESS TRANSLATION

[75] Inventors: Toshio Doi, Kokubunji; Takeshi Takemoto, Sagamihara, both of Japan; Yasuhiro Nakatsuka, Palo Alto, Calif.

[73] Assignee: Hitachi, Ltd., Tokyo, Japan

[ * ] Notice: The portion of the term of this patent subsequent to Oct. 26, 2010, has been disclaimed.

[21] Appl. No.: 386,757

[22] Filed: Feb. 10, 1995

Related U.S. Application Data

[62] Division of Ser. No. 103,791, Aug. 10, 1993, Pat. No. 5,392,416, which is a continuation of Ser. No. 603,620, Oct. 26, 1990, Pat. No. 5,257,361.

[30] Foreign Application Priority Data

Oct. 30, 1989 [JP] Japan ..................................... 1-282664

[51] Int. Cl.[6] .......................... G06F 12/00; G06F 12/08; G06F 12/10
[52] U.S. Cl. ......................... 395/449; 395/413; 395/417; 395/446; 364/243.41; 364/243.45; 364/255.5; 364/256.5; 364/DIG. 1
[58] Field of Search .................................... 395/446, 449, 395/413, 417; 364/243.41, 243.45, 255.5, 256.5

[56] References Cited

U.S. PATENT DOCUMENTS

| | | | |
|---|---|---|---|
| 4,084,230 | 4/1978 | Matick | 395/425 |
| 4,464,712 | 8/1984 | Fletcher | 395/425 |
| 4,825,412 | 4/1989 | Sager et al. | 365/49 |
| 4,926,317 | 5/1990 | Wallach et al. | 395/425 |
| 4,985,829 | 1/1991 | Thatte et al. | 395/425 |
| 4,991,081 | 2/1991 | Bosshart | 395/425 |
| 5,003,459 | 3/1991 | Ramanujan et al. | 395/400 |
| 5,008,813 | 4/1991 | Crane et al. | 395/400 |
| 5,119,290 | 6/1992 | Loo et al. | 395/425 |
| 5,257,361 | 10/1993 | Doi et al. | 395/425 |
| 5,392,416 | 2/1995 | Doi et al. | 395/425 |

FOREIGN PATENT DOCUMENTS 62-14453  9/1987  Japan .

*Primary Examiner*—Tod R. Swann
*Assistant Examiner*—Frank J. Asta
*Attorney, Agent, or Firm*—Antonelli, Terry, Stout & Kraus

[57] ABSTRACT

A processing apparatus of an integrated circuit structure for a multiprocessor system includes an execution unit operative on the basis of a virtual storage scheme and a cache memory having entries designated by logical addresses from the execution unit. For controlling the cache memory, a first address array containing entries designated by the same logical addresses as the cache memory and storing control information for the corresponding entries of the cache memory is provided in association with a second address array having entries designated by physical addresses and storing translation information for translation of physical addresses to logical addresses for the entries. When a physical address at which invalidation is to be performed is inputted in response to a cache memory invalidation request supplied externally, access is made to the second address array by using the physical address to obtain the translation information from the second address array to thereby generate a logical address to be invalidated. The first address array is accessed by using the generated logical address to perform a invalidation processing on the control information.

5 Claims, 12 Drawing Sheets

FIG. 3A
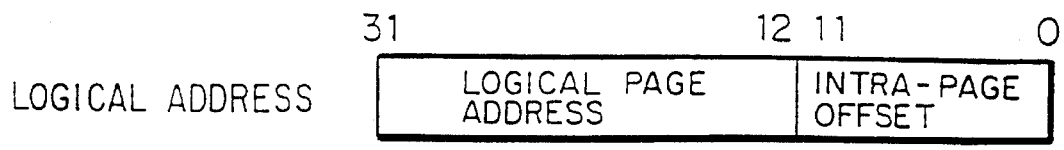
LOGICAL ADDRESS
LAA ENTRY DESIGNATING ADDRESS
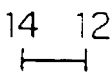
PAA LOGICAL PAGE ADDRESS TAG
FIG. 3B
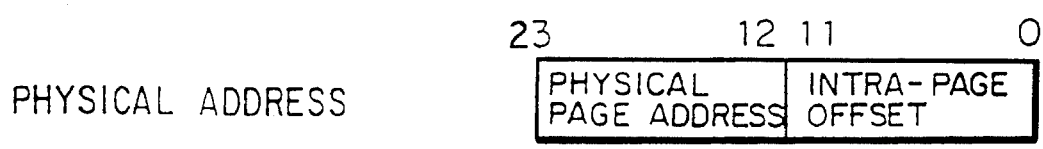
PHYSICAL ADDRESS
PAA ENTRY DESIGNATING ADDRESS
PAA PHYSICAL PAGE ADDRESS TAG
TO-BE-INVALIDATED BLOCK DESIGNATING ADDRESS

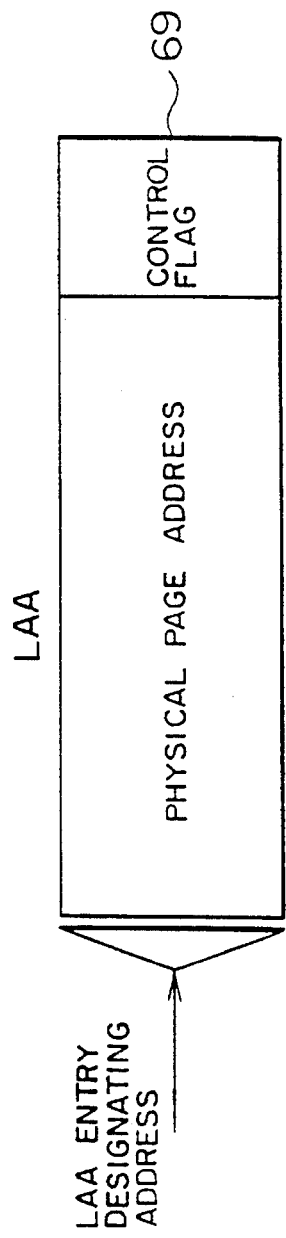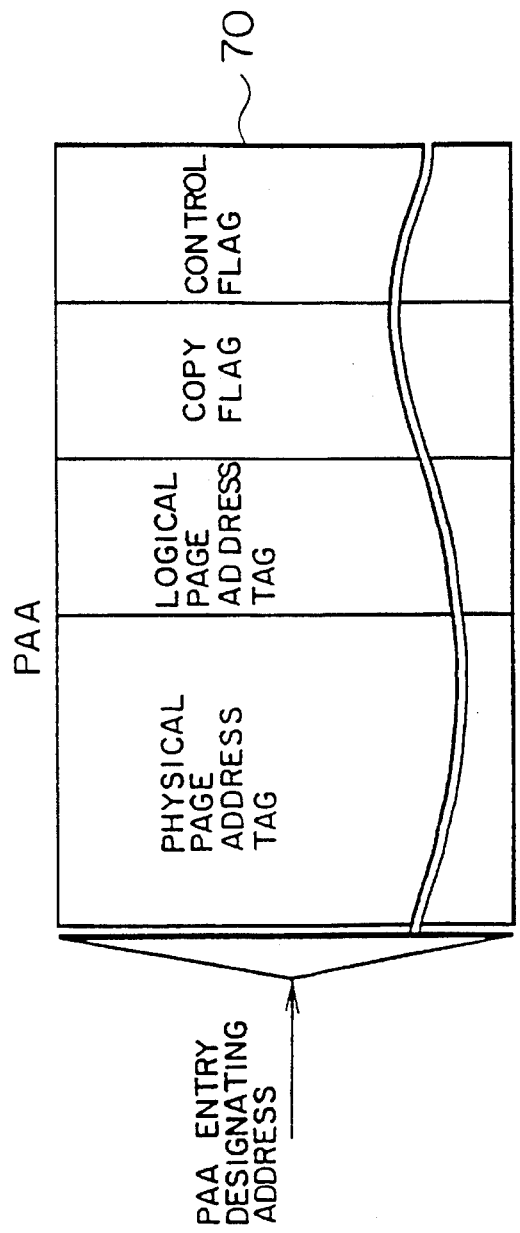

F I G. 10
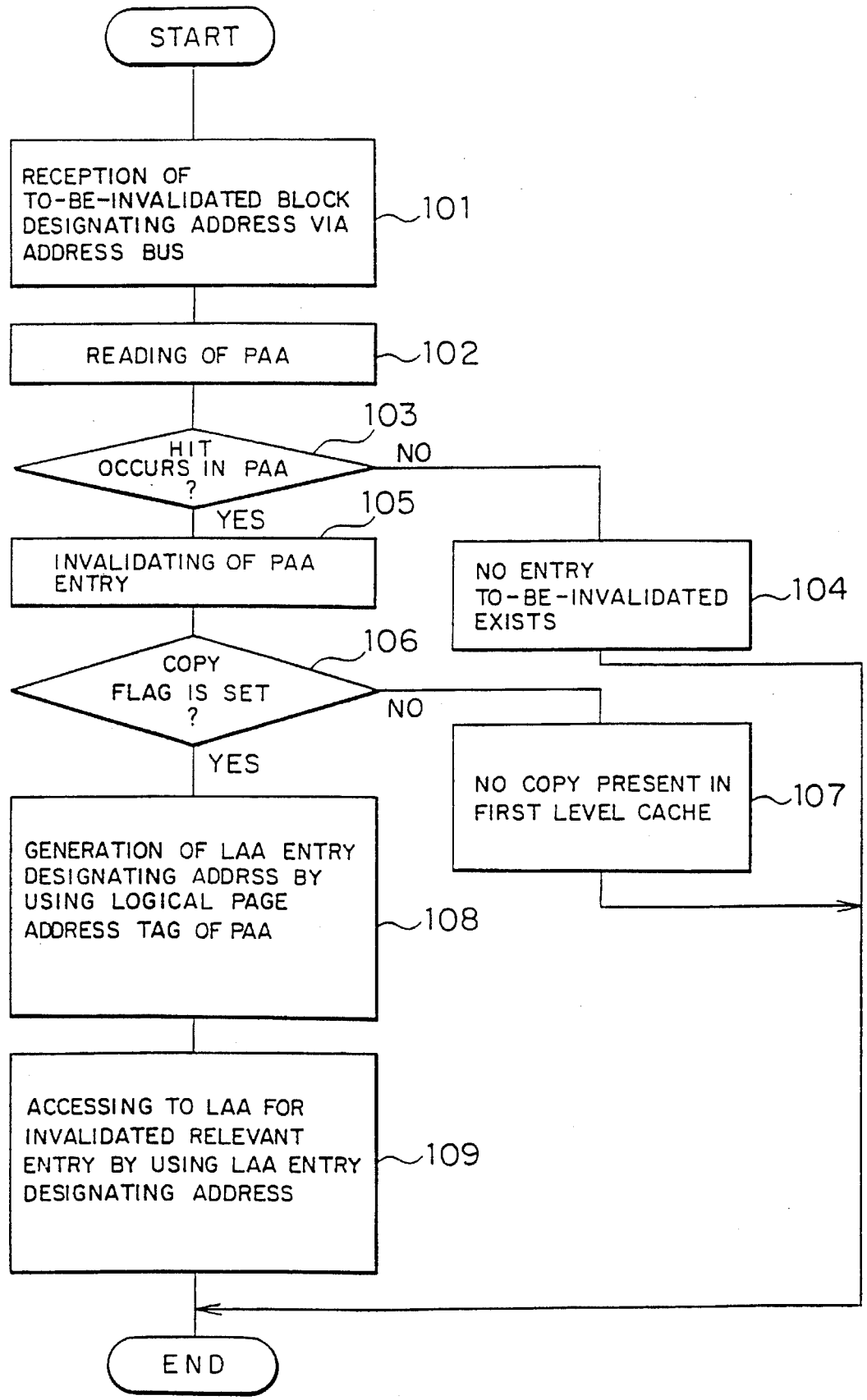

METHOD AND APPARATUS FOR CONTROLLING ONE OR MORE HIERARCHICAL MEMORIES USING A VIRTUAL STORAGE SCHEME AND PHYSICAL TO VIRTUAL ADDRESS TRANSLATION

This application is a 37 CFR § 1.60 divisional of prior application Ser. No. 08/103,791, filed Aug. 10, 1993, now U.S. Pat. No. 5,392,416, which is a continuation of Ser. No. 07/603,620, filed Oct. 26, 1990 now U.S. Pat. No. 5,257,361.

BACKGROUND OF THE INVENTION

The present invention relates generally to a data processing system such as a multiprocessor system which comprises a plurality of processors and a main memory common to the individual processors. More particularly, the invention is concerned with a cache memory controlling method and an apparatus for controlling the invalidating or purging of a cache memory or memories.

Data stored in the main memory is mapped to a cache memory on a block-by-block basis. In that case, the cache memory is provided with an address array (also referred to as a directory) which serves to hold addresses of corresponding main memory blocks.

When reference is made to the main memory by the processing apparatus or processor, the address for the reference is first compared with an address registered in the address array. When coincidence is found as a result of the comparison, then the corresponding block within the cache memory is referred to. Thus, the access time can be shortened. Parenthetically, a scheme for mapping a given or arbitrary main memory block or column to a given or arbitrary cache memory block is called a full associative scheme, and a scheme for mapping a main memory column to a cache memory block in one-to-one corresponding relation is called a direct mapping scheme. Further, mapping of a column on the main memory to one of a set of blocks of the cache memory is referred to as "set associative mapping".

In a multiprocessor system in which the main memory is shared in common among a plurality of processors which each have a private cache memory, it is required that the contents of the cache memories associated with the individual processors, respectively, be constantly up-to-date. Accordingly, when the content of a block in one cache memory is to be updated (or rewritten), all other cache memories have to be invalidated for that particular block. In this conjunction, it is noted that a block to be invalidated may contain up-to-date data. In that case, it is necessary to write back that block to the main memory from the cache memory in precedence to the invalidation of the latter.

One cache memory invalidation controlling system known heretofore is described in JP-A-62-214453, by way of example. Referring to FIG. 12 of the accompanying drawings, in the case of this prior art system, there are provided a logical tag memory (or logical address array) 71 and a physical tag memory (or physical address array) 72 which are accessed with a logical address for controlling the cache memory, such that the invalidation processing can be speeded up with the aid of these memories. Incidentally, the cache memory itself is omitted from the illustration in FIG. 12.

Referring to FIG. 12, a description will be made of the address registering operation to the tag memories 71 and 72. When the access made with a certain logical address results in a mishit in the cache memory, then a new block is read out from the main memory to be transferred to the processor. In parallel therewith, the new block inclusive of the address thereof is registered in the cache memory. To this end, there are registered in the logical tag memory 71 the 13th to 31st bits (19 bits) of the logical address (32 bits) in the logical address register 15 in correspondence to a set (address) of the 4th to 12th bits (9 bits) consisting of eight bits for the intra-page address plus one bit for the page address, while there are registered in the physical tag memory 72 the 12th to 23rd bits (12 bits in total) of the physical address (24 bits) after the address translation by an address translating part 75 in correspondence to the same set address. Registration at the same set address may be realized by supplying the same logical address to both the tag memories 71 and 72 from a logical address register 15 through a multiplexer 73.

Next, description will be turned to the invalidation processing control. An invalidating address sent from another processor is set at an address input register 17. Since the 4th to 11th bits of this set address represent the intra-page offset address for which the physical address and the logical address are identical with each other, the 4th to 11th bits are inputted intact to the physical tag memory 72 through the multiplexer 73. In contrast, the 12th bit has a value which can not be determined on the basis of the 12th bit of the physical address. For this reason, a value of "0" is generated by a counter 74 as the value of the 12th bit, whereon the physical tag memory 72 is read out for comparison with the 12th to 23rd bits (12 bits in number) of the address input register 17 by a comparator 77. When coincidence is found in the comparison, a controller 76 effects the invalidation processing after resetting the flag of the relevant block of the logical tag memory 71 to "0". On the other hand, when a discrepancy is detected from the comparison, a value "1" is generated by the above-mentioned counter 74 as the value of the 12th bit for thereby making access to the physical tag memory 72. In that case, since the logical address and the set address overlap each other for one bit, there are required two count operations by the counter and twice the number of access operations. However, when the overlap between the logical address and the set address extends over two or more bits, it is necessary to set the bit number of the counter to be equal to the bit number of the overlap, to thereby perform the access operation a number of times while performing the count operation for a corresponding number of times. More specifically, for an overlap over two bits, there are required four ($2^2=4$) access operations at maximum. Similarly, for an overlap over three bits, eight ($2^3=8$) access operations at maximum must be performed, while an overlap over four bits makes it necessary to perform the access operation sixteen times ($2^4=16$) at maximum.

As will be appreciated from the above, in the case of the prior art system, when the number of bits over which the page address included in the logical address and the set address overlap each other is increased as a result of increasing the capacity of the cache memory, the number of times the physical tag memory has to be accessed for effectuating the block invalidation processing of the cache memory is increased correspondingly. This means in turn that the increase in the number of bits by one for designating an entry in the cache memory involves twice as many entries in the cache memory. In that case, the number of times the physical tag memory has to be accessed is increased from two to four at maximum. More concretely, when the capacity of the cache memory is doubled, the number of times the physical tag memory is accessed is also doubled. Thus, there arises a problem that the time taken for the block invalidation processing of the cache memory is undesirably increased. Incidentally, there are disclosed in U.S. Ser. No. 07/525,080 filed May 17, 1990 and assigned to the same assignee as the present application and JP-A-62-80742 laid open on Apr. 14, 1987 approaches for reducing the overhead involved in the cache memory control by decreasing the number of times a tag memory (i.e. address array of a cache memory) is accessed in a cache memory control system of the set associative mapping type.

SUMMARY OF THE INVENTION

It is an object of the present invention to provide a cache memory control method and an apparatus for carrying out the same which are capable of reducing the time required for block invalidation processing by decreasing the number of times a tag memory (i.e. address array) is accessed, notwithstanding of any increase in the capacity of the cache memory.

Another object of the present invention is to provide a multiprocessor system in which a cache memory is implemented in a hierarchical multi-level structure and in which at least a first level cache memory and a processing unit including a CPU are implemented in an integrated structure on a single semiconductor chip.

In view of the objects mentioned above, there is proposed according to an aspect of the present invention a system for controlling a cache memory which comprises a first address array having entries designated by the same logical addresses as the cache memory for storing control information correspondingly for the entries of the cache memory, a second address array having entries designated by physical addresses and storing at each entry translation information for translation of the physical address to the logical address, input means for inputting the physical address at which invalidation is to be performed in response to an invalidation request to the cache memory, logical address generating means for generating a logical address to be invalidated on the basis of the above-mentioned translation information of the second address array by accessing it with the physical address supplied from the input means, and means for performing invalidation processing on the control information by making access to the first address array in response to the generated logical address.

According to a second aspect of the present invention, the second address array is provided with registrable entries which are greater in number than that of the entries capable of being registered in the first address array.

Further, according to a third aspect of the present invention, the translation information stored in the second address array for address translation of the physical address to the logical address is constituted by a part of the logical address for designating the entry of the first address array, which part corresponds to a remaining portion of the logical address from which a portion common to the physical address is excluded.

According to a fourth aspect of the present invention, there is proposed a cache memory control apparatus for use in a multiprocessor system which comprises a first address array having entries designated by the same logical addresses as a first level cache memory for storing control information correspondingly for the entries of the first level cache memory, a second address array having entries designated by the same physical addresses as a second level cache memory and storing at each entry additional translation information for translation of the physical address to the logical address and information indicating whether or not a copy of the entry of the second level cache memory corresponding to the entry of the first address array exists in the first level cache memory, logical address generating means responsive to the inputting of the physical address at which invalidation is to be performed in response to a cache memory invalidation request supplied externally for thereby making access to the second address array by using the physical address to thereby generate a logical address to be invalidated on the basis of the additional translation information obtained from the second address array, and invalidating means for making access to the first address array by using the logical address for performing an invalidation processing on the relevant control information in the first level cache memory.

It is further proposed in conjunction with the control system according to the fourth aspect of the invention that the second address array is provided with registrable entries which are greater in number than that of the entries capable of being registered in the first address array and that the first level cache memory and the execution unit including at least the logical address generating means and the invalidating means are implemented as an integrated circuit on a single substrate chip.

Describing generally the arrangement and operation of the invention, there is provided a physical address array (i.e. the physical tag memory) in addition to a logical address array. In this conjunction, it is noted that in the case of the prior art scheme, the physical address array is addressed with the logical address and only the physical page address tag and the control flag are registered at each entry. In contrast, according to the teachings of the invention, the physical address array is accessed by using the physical address, wherein the reverse translation to a logical address is carried out. To this end, it is taught by the present invention to store at each entry of the physical address array the translation information (i.e. logical page address tag) for allowing the physical address to be translated to the logical address. With such arrangement, the invalidation or purging request which designates the entry to be invalidated by a physical address can be processed by making access to the physical address array with the physical address to thereby read out the logical page address tag of the relevant entry, whereby a logical address of the cache memory at which the invalidation is to be performed can be generated on the basis of the logical page address tags as read out and the intra-page offset address of the physical address designating an entry to be invalidated. By making access to the logical address array with the aid of the generated logical address, the corresponding control flag in the logical address array is reset "OFF", whereon the invalidation processing comes to an end. In this way, access to the address array only once for the invalidation processing is sufficient no matter how large the capacity of the cache memory is.

In order to reduce the entry collision frequency in the address array, it is preferred that the number of the entries of the address array which are designated by the physical addresses be greater than that of the entries of the address array designated by the logical addresses. In this conjunction, it can be understood that although collision taking place in the logical address array results in no more than impossibility of registration in the cache memory, collision occurring in the physical address array makes a registrable region in the cache memory unusable.

Further, according to another aspect of the present invention, it is proposed in connection with the processor including two levels of cache memories to store in the address array for managing or controlling the second level cache memory a flag indicating whether or not a copy of corresponding entries exists within the first level cache memory.

BRIEF DESCRIPTION OF THE DRAWINGS

FIGS. 3A and 3B are diagrams showing, respectively, address structures of a logical address and a physical address used in the processor shown in FIG. 1;

FIGS. 9A and 9B are diagrams showing, respectively, internal structures of a logical address array and a physical address array employed in the processor shown in FIG. 6;

FIG. 10 is a flow chart for illustrating a cache memory invalidation processing operation carried out by the processor shown in FIG. 6;

DESCRIPTION OF THE PREFERRED EMBODIMENTS

Now, the present invention will be described in detail in conjunction with preferred or exemplary embodiments thereof with reference to the accompanying drawings.

Figure 1:
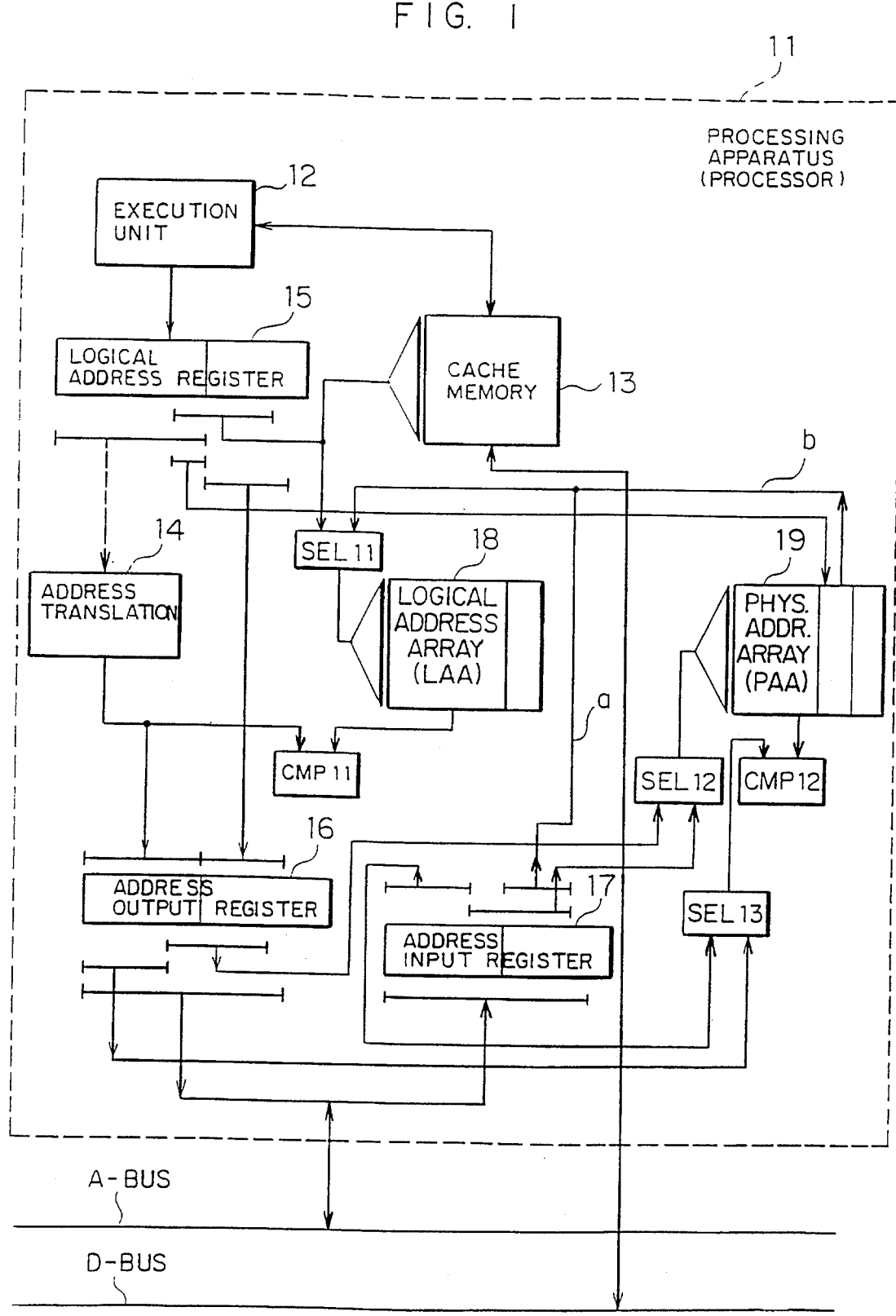
FIG. 1 is a block diagram showing a general arrangement of a processing apparatus or processor according to an embodiment of the present invention.

FIG. 1 is a block diagram showing a general arrangement of an processing apparatus or processor to which the teachings of the invention are applied.

In FIG. 1, a reference numeral 11 denotes generally a processing apparatus adapted to perform a cache control processing inclusive of cache memory invalidation processing. The numeral 12 denotes an execution unit for performing operations or processing by executing a program, the numeral 13 denotes a cache memory of the set associative type for storing a copy of data blocks stored in a main memory. The numeral 14 denotes an address translation unit, such as a translation look-aside buffer, for translating a logical address to a physical address; the numeral 15 denotes a logical address register which serves to hold therein a logical address for referring to a logical address array in order to discriminatively decide whether or not a concerned data block is stored in the cache memory 13; the numeral 16 denotes an address output register for holding therein the physical address resulting from the address translation by said address translation unit 14; and numeral 17 denotes an address input register for holding therein the physical address to be referred to in performing the cache memory invalidation processing. The numeral 18 denotes a logical address array (LAA in abbreviation) which can be accessed with the aid of a logical address and which stores as entries the start physical page addresses of the data blocks stored in the cache memory 13 together with control flags indicating whether or not the associated blocks are valid or not. The numeral 19 denotes a physical address array (PAA) which is adapted to be accessed with a physical address and which stores as entries the physical page address tags of the data blocks stored in the cache memory 13 together with corresponding logical page address tags and control flags indicating whether or not the associated blocks are valid or not. The reference symbol SEL 11 denotes a selector for selecting either the access to the cache memory 13 from the logical address register 15 upon registration or reference thereto or the access from the physical address array (PAA) 19 and the address input register 17 to the cache memory 13 upon cache invalidation processing. The reference symbol SEL 12 denotes a selector for selecting either the access from the address output register 16 to the physical address array 19 or the access from the address input register 17. The symbol SEL 13 denotes a selector for selecting either access from the address output register 16 or access from the address input register upon reference operation. The symbol CMP 11 denotes a comparator for comparing the physical page address resulting from the address translation with the physical page address tag representing the contents of the logical address array (LAA) 18. The CMP 12 denotes a comparator for comparing the physical page address tag of the address output register 16 or address input register 17 with the physical page address tag representing the content of the physical address array (PAA) 19. The symbol A-BUS denotes an address bus, and the symbol D-BUS denotes a data bus.

In the illustrative embodiment of the processing apparatus or processor shown in FIG. 1, the important features can be seen, among others, in the provision or arrangement mentioned below:

(a) The physical address array (PAA) 19 is provided which serves for storing the logical page address tags and which is addressed with the physical address; and (b) a line a is provided for outputting the intra-page offset address placed in the address input register together with a line b for outputting the logical page address tag placed in the physical address array 19 upon execution of the cache memory invalidation processing, wherein the intra-page offset address and the logical page address tag are merged for enabling the access to the logical address array 18 via the selector SEL 11.

Figure 2A:
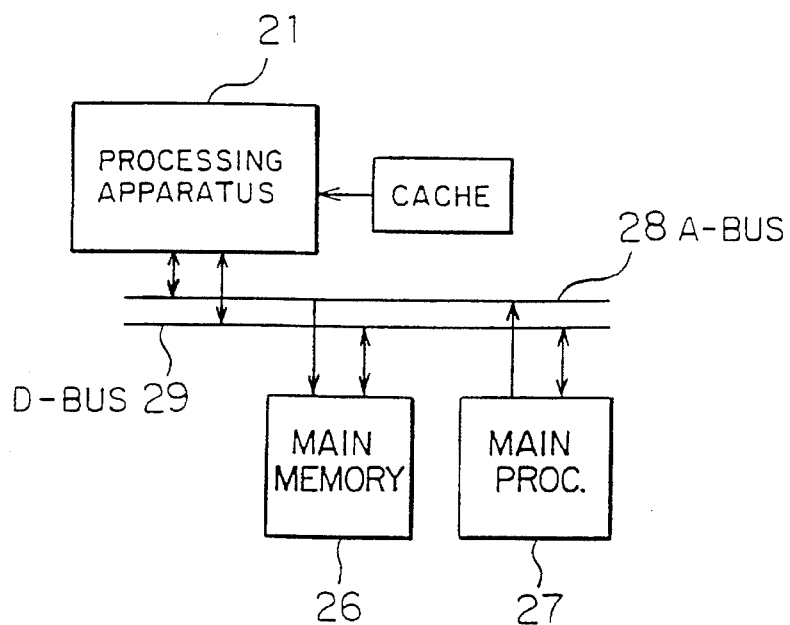
FIGS. 2A and 2B are block diagrams showing schematically general arrangements of two computer systems including the processor(s) shown in FIG. 1, respectively.
Figure 2B:
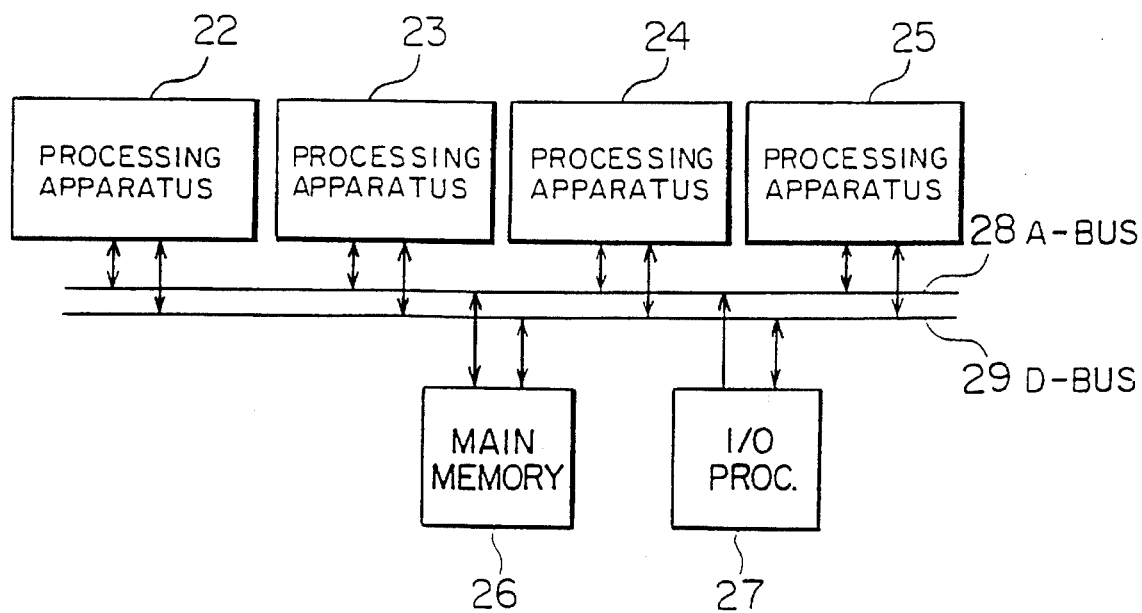

FIGS. 2A and 2B show schematically structures of computer systems each including the processing apparatus or apparatuses described above with reference to FIG. 1.

In FIGS. 2A and 2B, reference numerals 21 to 25 denote the processing apparatuses, respectively, a numeral 26 denotes a main memory (MM), 27 denotes an input/output processing unit (IOP), 28 denotes an address bus, and a numeral 29 denotes a data bus.

Referring to FIG. 2A, the processing apparatus 21, the main memory 26 and the input/output processing unit 27 are connected to one another by way of the address bus 28 and the data bus 29. The processing apparatus 21 includes internally a cache memory (not shown in this figure) for the purpose of reducing the time required for access to data stored in the main memory. To this end, the cache memory holds a copy of a part of the contents of the main memory 26. On the other hand, the input/output processing unit 27 is responsible for the data transfer between the main memory 26 and peripheral units (not shown).

When the content stored in the main memory 26 at a region for which a copy of the content is held in the cache memory incorporated in the processing apparatus 21 is altered or changed by the input/output processing unit 27, a discrepancy occurs between the content of the main memory and that of the cache memory. Accordingly, in order to prevent erroneous operation due to the discrepancy between the memory contents, it is necessary to invalidate or purge the content of the cache memory which holds a copy of the altered part of the content of the main memory 26 when the content of the main memory is altered or updated. For this reason, the input/output processing unit 27 sends to the processor or processing apparatus 22 via the address bus A-BUS the address (physical address) of the region of the main memory 26 where the content thereof is altered. The processing apparatus 21 responds to the reception of the above-mentioned physical address (which is placed in the address input register 17 shown in FIG. 1) by checking whether or not a copy of the relevant region of the main memory exists in the cache memory. When it exists in the cache memory, that portion is invalidated. Stated another way, the corresponding control flag for the logical address array 18 shown in FIG. 1 is set to the state "OFF".

Next referring to FIG. 2B, there is shown a computer system of a multiprocessor structure which includes a plurality of processing apparatus or processors. In the case of this type of computer system, there arises the necessity, in addition to the operation described above by reference to FIG. 2A (i.e. messaging of the content alteration of the main memory 26 via the input/output processing unit 27), that when a given one of the processors 22 to 25 alters the content of the main memory, the address of the altered content be sent to the other processors to thereby invalidate or purge the corresponding portions of the cache memories incorporated in the other processors.

FIGS. 3A and 3B are diagrams showing bit structures, respectively, of the logical address and the physical address used in the processing apparatus shown in FIG. 1.

As can be seen in FIG. 3A, the logical address consists of 32 bits and comprises the logical page address formed by the 12th to 31st bits (20 bits in total) and the intra-page offset address formed by the 0th to 11th bits (12 bits in total). At this juncture, it is to be noted that the bit contents of the intra-page offset addresses of the logical address and the physical address are identical with each other.

The LAA (logical address array) entry designating address for making access to the logical address array or LAA 18 consists of the 4th to 14th bits (11 bits in total) and comprises the intra-page offset address of eight bits and the logical page address portion of three bits. Thus, the number of bits at the overlap between the page address and the set address in the logical address is three bits, i.e. the 12th to 14th bits.

The PAA (physical address array) logical page address tag stored in the physical address array or PAA 19 consists of the 12th to 14th bits (three bits) and corresponds to the overlap portion between the page address and the set address of the logical address. By storing the logical page address tag in the physical address array 19 to thereby merge the tag with the intra-page offset address, the logical address can be completed.

Next, referring to FIG. 3B, the physical address consists of 24 bits and comprises the physical page address formed by the 12th to 23rd bits (12 bits in total) and the intra-page offset address formed by the 0th to 11th bits (12 bits in total). The PAA entry designating address for making access to the physical address array or PAA 19 consists of the 4th to 14th bits (11 bits) and comprises the intra-page offset address portion of eight bits and the physical page address portion of three bits. The content of the PAA entry designating address differs from that of the LAA entry designating address only in the three bits of the overlap portion. The PAA physical page address tag stored in the physical address array 19 consists of the 15th to 23rd bits (9 bits) and constitutes a part of the physical page address. Further, the to-be-invalidated block designating address used for execution of the invalidation processing consists of the 4th to 23rd bits (20 bits), wherein the PAA entry designating address part of the to-be-invalidated block designating address placed in the address input register 17 shown in FIG. 1 is used for making access to the physical address array 19 to thereby read out the PAA physical page address tag of the relevant entry. The PAA physical page address tag read out from the physical address array or PAA 19 is compared with the corresponding 15th to 23rd bits (9 bits) of the to-be-invalidated block designating address by the comparator CMP 12. When the comparison results in coincidence and when the control flag of this entry is set, the logical page address tag is read out from the physical address array 19, which tag is then merged with the intra-page offset address part of the to-be-invalidated block designating address in order to make access to the logical address array 18. By turning "OFF" the control flag for the relevant entry, the data block of concern stored in the cache memory 13 can be invalidated.

Now, referring again to FIG. 1, a description will be made in detail of operation of the processing apparatus to which the present invention is applied.

When the execution or processing unit 12 is to access a memory in the course of processing, the former supplies the logical address of the memory (hereinafter referred to as object memory) to the logical address register 15. Next, in order to check whether or not a copy of the object memory is present within the cache memory 13, the output of the logical address register 15 is selected by the selector SEL 11, whereon access is made to the logical address array 18 with the aid of the logical address outputted from the logical address register 15 for thereby searching the relevant entry.

Referring to FIG. 3A, designation of the entry in the logical address array 18 and the cache memory 13 is performed by using the more significant eight bits of the intra-page offset address and the less significant three bits of the logical page address (11 bits in total). At the same time, the cache memory 13 is also accessed with the designating address mentioned above. In parallel with the access to the logical address array 18 and the cache memory 13, the logical page address is translated into the physical page address. To this end, there may be employed, for example, a TLB (Translation Lookaside Buffer) described in Japanese periodical "Jouhou Shori (Information Processing)". Vol. 21. No. 4 (April, 1980), pp. 332–340.

The physical page address read out from the relevant or pertinent entry by accessing the logical address array 18 is compared through the comparator CMP 11 with the physical page address resulting from the translation performed by the address translation part 14.

When the comparison by the comparator CMP 11 results in coincidence between both the above-mentioned addresses and when the control flag of the logical address array 18 indicates that the relevant entry is valid, this means that the copy of the object memory is present within the cache memory 13. Thus, the execution unit 12 may make access to the cache memory 13 for using the data block read out from the cache memory 13.

Figure 4A:
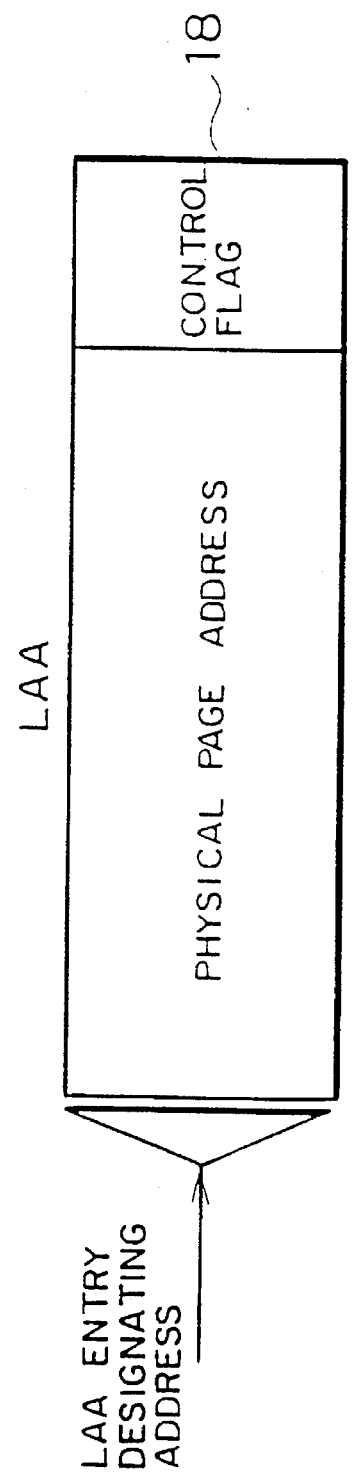
FIGS. 4A and 4B are diagrams showing, respectively, internal structures of a logical address array and a physical address array employed in the processor shown in FIG. 1.
Figure 4B:
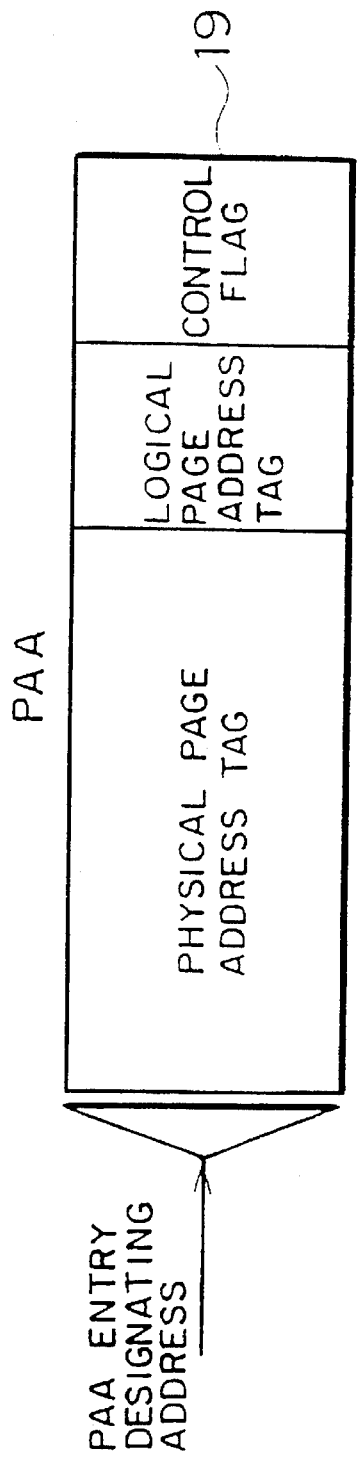

FIG. 4A and 4B illustrate, respectively, internal structures of data stored in the logical address array and the physical address array shown in FIG. 1.

In the case of the logical address array 18 shown in FIG. 4A, each entry is designated with the LAA entry designating address. The content of each entry in the logical address array 18 is composed of the physical page address of the corresponding entry in the cache memory 13 and the control flag. The control flag serves to indicate whether the corresponding entry in the cache memory 13 is valid or invalid. By way of example, a logic "1" may be stored as the flag when the associated entry is valid, while the flag may be set to "0" in case the entry is invalid.

On the other hand, in the case of the physical address array 19 shown in FIG. 4B, each entry thereof is designated with the PAA entry designating address. The content of each entry of the physical address array includes the page address tag storing a part of the physical page address which is not used for the entry designation, the logical page address tag required for the corresponding entry in the cache memory 13 to be designated with the LAA entry designating address, and the control flag indicating whether or not the corresponding entry exists within the cache memory. Of the tags mentioned above, the logical page address tag represents the content newly stored according to the teachings of the present invention.

Figure 5:
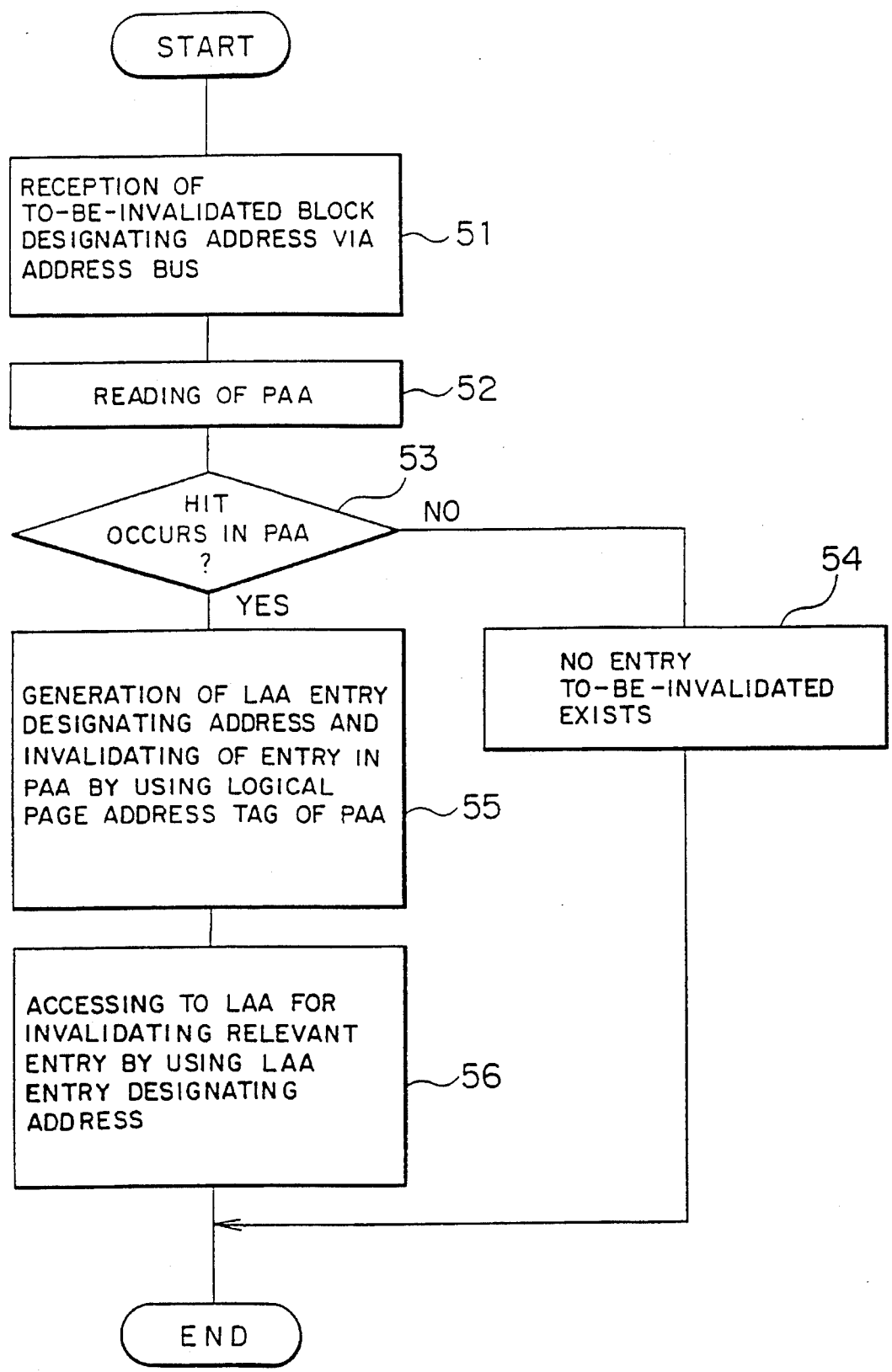
FIG. 5 is a flow chart for illustrating a cache memory invalidation processing operation performed by the processor shown in FIG. 1.

FIG. 5 is a flow chart for illustrating a cache memory invalidation processing performed in the apparatus shown in FIG. 1.

It is now assumed that there is issued to the processing apparatus shown in FIG. 1 a cache memory invalidation or purging request from the input/output processing unit 27 shown in FIG. 2A or 2B, or from one of the processing apparatuses 22–25 shown in FIG. 2B.

Referring to FIG. 1, the physical address of a region to be invalidated is fetched by the physical address input register 17 via the address bus A-BUS (step 51). The address input register 17 is of such a structure as shown in FIG. 3B. Designation of the entry in the physical address array 19 is effected with the most significant eight bits of the intra-page offset address and the least significant three bits of the physical page address, as described hereinbefore with reference to FIG. 3B.

For the invalidation processing, the selector SEL 12 is so controlled that the entry in the physical address array 19 can be designated by the output of the address input register 17, whereon the physical address array 19 is accessed to read out the physical page address tag of the relevant entry (step 52).

The physical page address tag read out is compared with the output of the address input register 17 by the comparator CMP 12. When the comparison results in coincidence and when the control flag indicates that the corresponding entry is present within the cache memory 13 (step 53), it is then decided that the entry to be invalidated exists in the cache memory 13 (i.e. the cache memory is hit). Unless the cache memory is hit, this means that no entry to be invalidated exists in the cache memory. In this case, the processing comes to an end (step 54). When the cache memory is hit, the control flag entry of the physical address array 19 is invalidated, while the corresponding physical address is translated into the logical address by using the intra-page offset address of the address input register 17 and the logical page address tag of the physical address array 19, whereon the above-mentioned logical address is merged with the intra-page offset address of the address input register 17 to thereby generate the LAA entry designating address (step 55).

In this manner, the LAA entry designating address can be generated by sending out the intra-page offset address of the address input register via the signal line a while sending out the logical page address tag of the physical address array 19 via the signal line b for thereby allowing the intra-page offset address and the logical page address tag to merge with each other at an interconnection point of the signal lines a and b. By using the LAA entry designating address thus generated, access is made to the logical address array 18 to thereby invalidate the relevant entry by rewriting the content of the LAA control flag such that the flag indicates invalidity (step 56). Thus, the invalidation processing has been completed.

In this way, according to the teachings of the invention as provided in the illustrative embodiment described above, the access to the logical address array 18 involved in the invalidation processing is performed only once in response to the invalidation request issued from the input/output processing unit or other processing unit regardless of the capacity of the cache memory 13 (i.e. even when the cache memory 13 has any increased capacity), as a result of which the time taken for the invalidation processing, as well as the frequency of collision in the accesses to the logical address array 18 made from the execution unit 12 or externally, can be reduced significantly, which in turn means that the processing or operation can be speeded up, to a great advantage.

In the above description, it has been assumed that the number of entries in both the logical address array 18 and the physical address array 19 is the same. It should however be understood that this is not an indispensable requirement of the present invention. In other words, the number of the entries stored in the physical address array 19 may be greater than that of the entries stored in the logical address array 18. More specifically, when a plurality of logical addresses are mapped for one and the same entry in the logical address array 18, the entry mapped latter is made valid. However, this does not mean that the entries in the cache memory 13 becomes useless. In contrast, when collision to the physical address array 19 occurs for the logical address for which no collision takes place to the logical address array 18, no registration is allowed notwithstanding the margins available in the cache memory 13 and the logical address array 18, whereby regions or areas in the cache memory 13 are made unusable. Such situation has to be avoided at any rate. From this standpoint, the number of the entries in the physical address array 19 should preferably be greater than that of the entries in the logical address array 18 to thereby decrease the frequency of collisions such as mentioned above.

In the case of the embodiment of the invention described so far, the memory hierarchy as viewed from the side of the execution or processing unit 12 is designed in two levels or layers of the cache memory and the main memory, respectively. In this conjunction, it is noticed that high-speed implementation of the cache memory is attempted in accompanying the high-speed operation capability of the execution or processing unit 12 in recent years. By way of example, a high-performance cache memory has a short access time, for example, less than 10 ns. On the other hand, concerning the main memory which is required to have a greater capacity in nature, the trend of high-speed implementation is not so strong as the cache memory. Conventionally, a dynamic RAM (random access memory) having an access time in the order of 100 ns, for example, is employed as the main memory. In reality, there is a tendency for the difference in the operation speed between the cache memory and the main memory to be increased more and more.

Under the circumstance, there has been a proposal that a second cache memory having a middle access time could be inserted between the cache memory and the main memory mentioned above to thereby establish a memory hierarchy in three layers or levels.

Figure 7B:
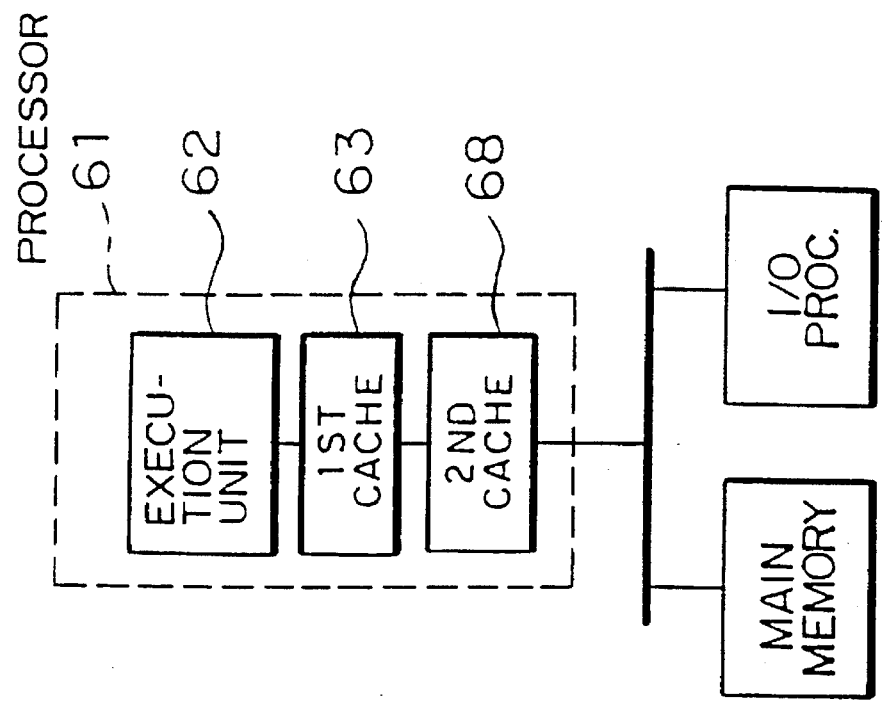
FIGS. 7A and 7B are schematic diagrams for illustrating comparatively the structures of the processors shown in FIGS. 1 and 6, respectively.
Figure 7A:
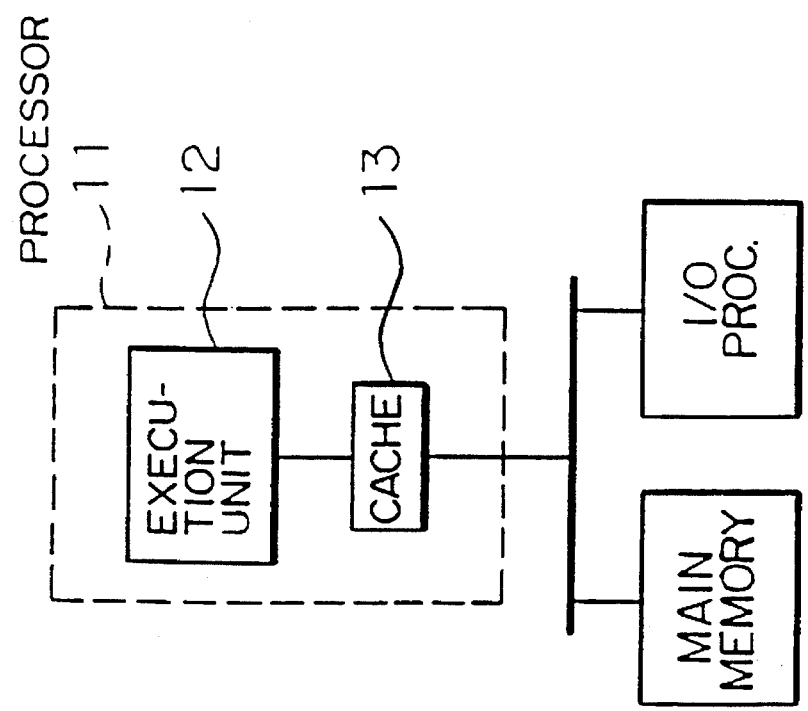

FIGS. 7A and 7B are diagrams for illustrating comparatively two-level (layer) and three-level (layer) memory schemes.

More specifically, FIG. 7A shows a diagram of a two-level memory scheme, while FIG. 7B shows a three level memory system. Referring to FIG. 7A, there are provided two levels of memory including a cache memory 13 and a main memory MM, respectively, in association with an execution unit or processing unit 12. On the other hand, in the system shown in FIG. 7B, there are provided a first cache memory 63, a second cache memory 68 and a main memory MM in association with the processing unit 62, wherein a copy of a part of the contents in the main memory MM exists in the second cache memory 68 with a copy of a part of the contents in the second cache memory 68 being held in the first cache memory 63.

Figure 6:
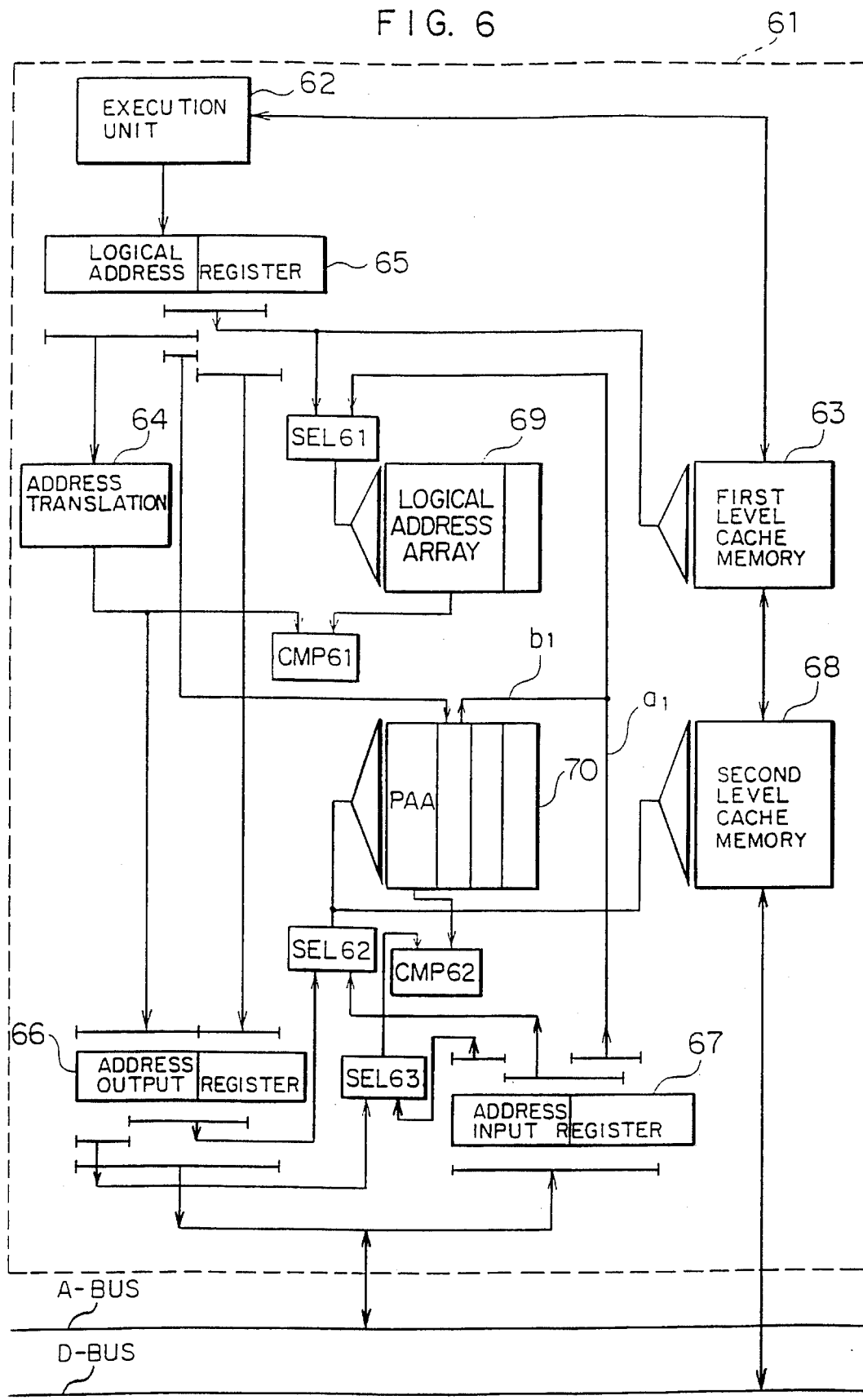
FIG. 6 is a block diagram showing a general arrangement of an information processing apparatus or processor according to another embodiment of the invention.

FIG. 6 is a block diagram showing a general arrangement of the processing apparatus according to another exemplary embodiment of the invention in which the three-level memory scheme such as shown in FIG. 7B is employed.

In FIG. 6, a reference numeral 61 generally denotes a processing apparatus, 62 denotes an execution or processing unit, 63 denotes a first level cache memory, 64 denotes an address translation unit, 65 denotes a logical address register, 66 denotes an address output register, 67 denotes an address input register, 68 denotes a second layer cache memory, 69 denotes a logical address array, 70 denotes a physical address array, SEL 61, SEL 62 and SEL 63 denote selectors, respectively, and CMP 61 and CMP 62 denote comparators, respectively.

In the case of the instant embodiment now under consideration, the first level cache memory 63 is accessed by using a logical address, and the second level cache memory 68 is accessed by using a physical address.

Features characterizing the second embodiment of the invention are seen in that the physical address array 70 holds therein a copy flag indicating that a copy of entries in the physical address array 70 which are copied to the second level cache memory 68 is stored in the first level cache memory 63 and that a signal line $b_1$ for transferring the logical page address tag in the physical address array 70 is provided together with a signal line $a_1$ for transferring the intra-page offset address of the address input register 67, wherein both the signals are merged together to thereby generate the LAA entry designating address for making access to the logical address array 69.

Figure 8A:
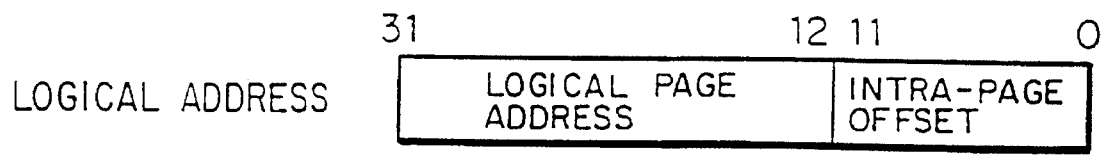
FIGS. 8A and 8B are diagrams for illustrating address structures of the logical address and the physical address used in the processor shown in FIG. 6.
Figure 8B:
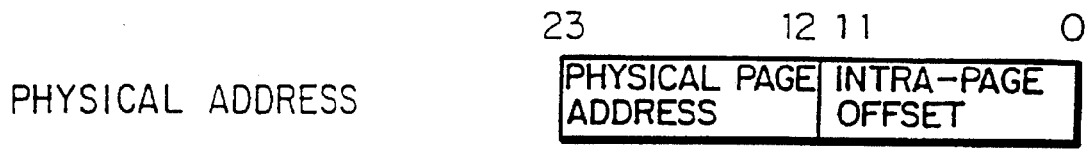

FIGS. 8A and 8B are schematic diagrams illustrating the bit structures of the logical address and the physical address, respectively, which are employed in the processing apparatus shown in FIG. 6.

Referring to FIG. 8A, the logical address comprises a logical page address consisting of the 12th to 31st bits (20 bits in total) and an intra-page offset address consisting of the 0th to 11th bits (12 bits in total). The entry designating address for the logical address array 69 and the first level cache memory 63 consists of the 4th to 14th bits (11 bits in total), wherein the number of bits in the overlap portion between the logical page address and a set address is three. The PAA logical page address tag stored in the physical address array 70 is constituted by the above-mentioned overlap bits (i.e. three bits represented by the 12th to 14th bits).

Turning to FIG. 8B, the physical address comprises a physical page address consisting of the 12th to 23rd bits (12 bits in total) and an intra-page offset address consisting of the 0th to 11th bits (12 bits in total). The entry designating address for the physical address array 70 and the second layer (level) cache memory 68 consists of the 5th to 17th bits (13 bits in total). Further, the PAA physical page address tag stored in the physical address array 70 consists of the 18th to 23rd bits (6 bits). Finally, the to-be-invalidated block designating address for making access to the physical address array upon invalidation processing consists of the 5th to 23rd bits (19 bits in total).

FIGS. 9A and 9B are diagrams showing, respectively, internal structures of the logical address array and the physical address array shown in FIG. 6.

Referring to FIG. 9A, the entry in the logical address array 69 is designated by the LAA entry designating address. The content of each entry includes a control flag which indicates whether the physical page address and the entry stored in the first layer or level cache memory 63 corresponding to the designated logical address is valid or not. The entry in the physical address array 70 shown in FIG. 9B is designated by the PAA entry designating address. The content of each entry includes a physical page address tag storing a part of the physical page address which is not used for designating the entry, a logical page address tag constituted by the overlap portion between the logical page address and the set address, a copy flag indicating whether or not a copy of the entry of concern exists in the first level cache memory 63, and a control flag indicating whether or not the corresponding entry is present within the second level cache memory 68. Except for the copy flag, the tags and the control flags mentioned above have the same contents as those shown in FIG. 4.

Now referring to FIG. 6, the operation of the processing apparatus shown therein will be described below in detail.

When the execution or processing unit 62 makes access to the main memory in the course of a processing operation, the logical address of a memory of concern (hereinafter referred to as the object memory) is outputted to the logical address register 65. Then, it is checked to see whether or not a copy of the contents of the logical address is present within the first level cache memory 63 by searching the logical address array 69. This operation is the same as that of the first embodiment shown in FIG. 1. Unless the copy is present within the first cache memory 63, a decision is made as to whether or not the copy of concern exists in the second cache memory 68 by searching the physical address array 70. In order to generate the entry designating address (physical address) for the physical address array 70, the content of the logical address register 65 is translated to the physical address through the address translation unit 64 to place the physical address in the address output register 66. By changing over the selector SEL 62 to the address output register 66, the physical address array 70 is accessed with the PAA entry designating address. Each entry in the physical address array 70 corresponds to each entry of the second cache memory 68. When a hit is found in the physical address array 70, the corresponding entry in the second level cache memory 68 is copied or mapped to the first level cache memory 63 while the copy flag for the physical address array 70 is set to logic "1", for indicating that the entry of concern exists in the first level cache memory 63. Parenthetically, when the entry or entries are to be copied or mapped to the first level cache memory 63 from the second level cache memory 68, the relevant entry is read out from the second level cache memory 68 by the controller (not shown) to be subsequently transferred to the first level cache memory 63 at an empty or idle area thereof, whereon the entry read out is stored to the idle region or area of the first layer cache memory 63.

FIG. 10 is a flow chart illustrating operation for purging the cache memory shown in FIG. 6.

Upon inputting of a request for purging the cache memory to the processing apparatus shown in FIG. 6 from the input/output processing unit or other processing apparatus, the physical address of a region or area where the cache memory is to be invalidated is fetched to the address input register 67 from the address bus A-BUS (step 101). Subsequently, the selector SEL 62 is changed over to the address input register 67, whereon the physical address array 70 is accessed by using the 5th to 17th bits of the address input register 67 as the PAA entry designating address (step 102). The physical page address array tag read out from the physical address array 70 is compared with the output of the address input register 67 through the comparator CMP 62, to thereby check whether or not both coincide with each other and whether the control flag indicates that the entry of concern is valid (step 103). Unless a hit is encountered, a decision is made that there exists no entry to be invalidated, whereon the processing is terminated (step 104).

On the other hand, when a hit is found, the relevant entry of the physical address array 70 is made invalid with the control flag being reset "OFF" (step 105). Subsequently, it is checked whether or not the copy flag of that entry is set (step 106). Unless the copy flag is set (NO), this means that no copy is present within the first level cache memory 63. Consequently, the processing comes to end (step 107). On the other hand, when the copy flag is set, the logical page address tag is read out from the physical address array 70 to be transferred to the selector SEL 61 via the signal line b, while the intra-page offset address of the address input register 67 is read out to be sent to the selector SEL 61 via the signal line a. On the way, both the tag and the address mentioned above are merged to thereby generate a LAA entry designating address (step 108). By changing over the selector SEL 61 to the physical address array 70, the logical address array 69 is accessed by using the LAA entry designating address, and the control flag for the relevant entry is reset to "OFF". Thus, the invalidation processing is completed.

As will be understood from the above description, in the processing apparatus having three levels of memories to which the present invention is applied, the invalidation processing can be completed by making access only to the physical address array 70 in case the entry to be invalidated exists only in the second level memory 68. Further, when the entry to be invalidated exists in the first level memory 63 as well, the invalidation processing is completed by making access only to the logical address array 69 in addition to the physical address array 70.

In this manner, the number of times the address array is to be accessed in executing the invalidation processing can be reduced to a minimum, whereby the invalidation processing is speeded up.

Figure 11:
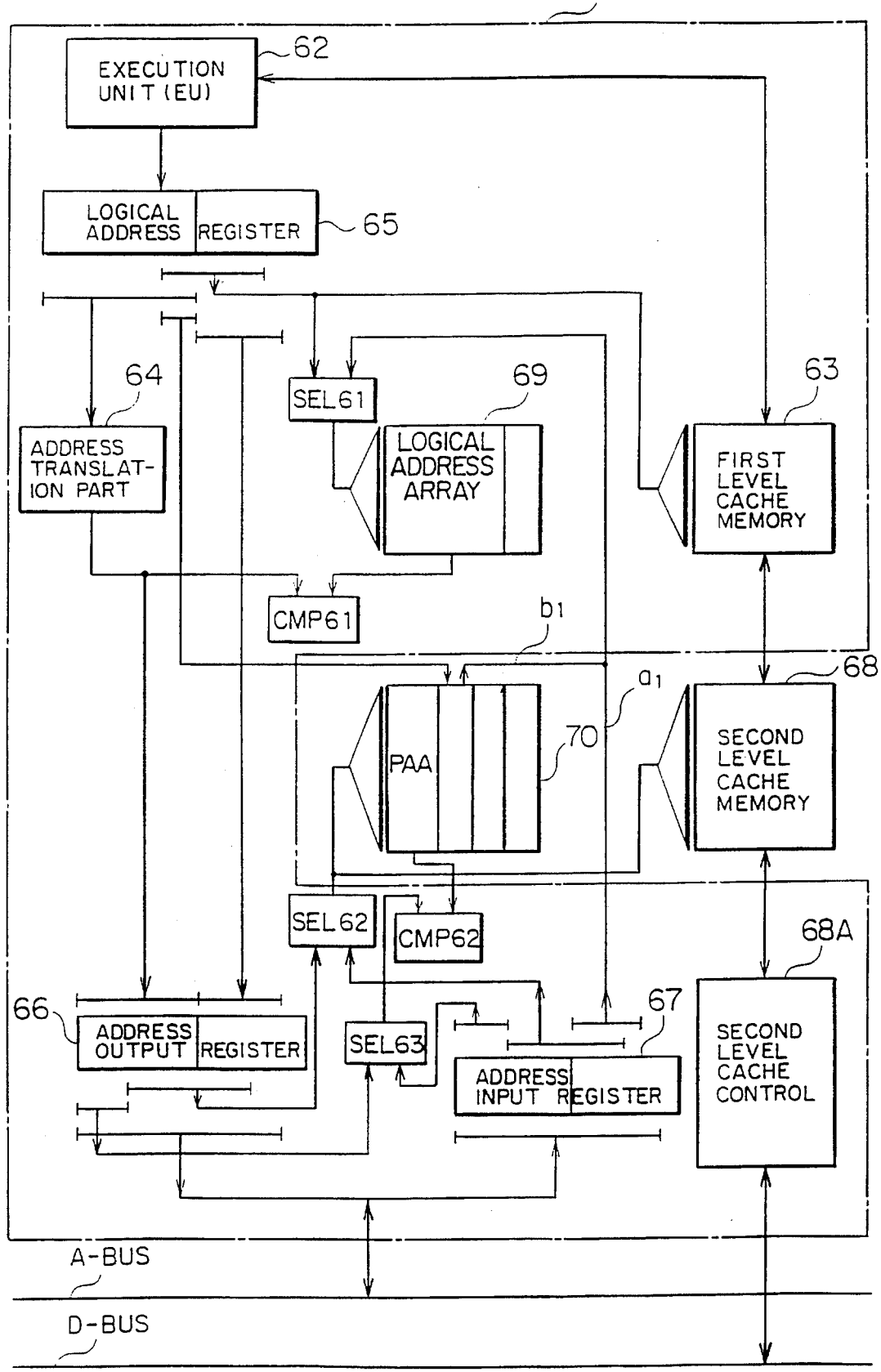
FIG. 11 is a block diagram showing a modification of the processor shown in FIG. 6 and applied to a multiprocessor system, wherein parts except for a second level cache memory and a logical address array are integrated on one semiconductor chip.
Figure 12:
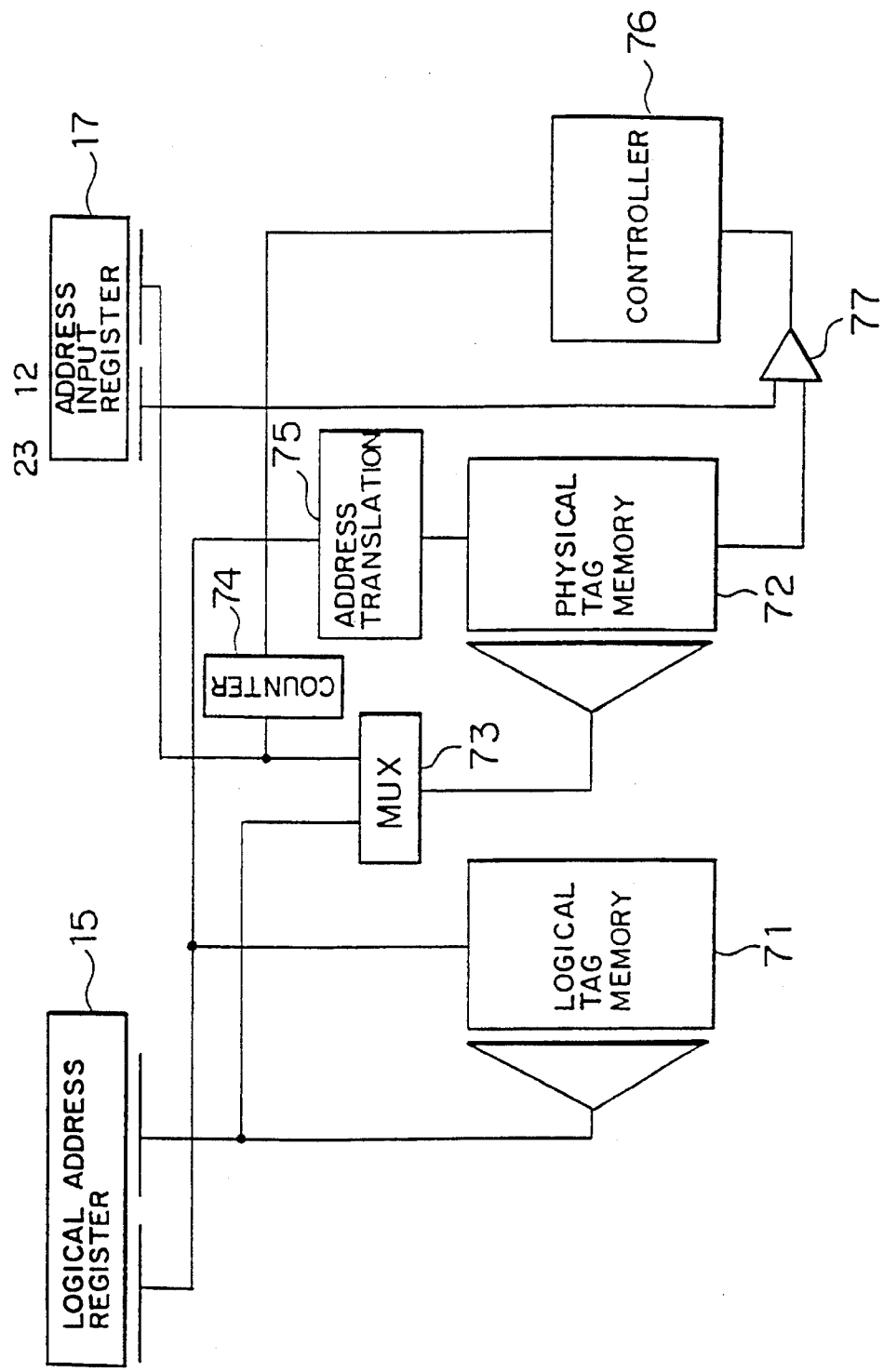
FIG. 12 is a functional block diagram for illustrating a cache memory invalidation processing known heretofore.

FIG. 11 shows a modified embodiment of the present invention according to which the processing apparatus shown in FIG. 1 is partially implemented in an integrated circuit.

In FIG. 11, a block 61A shows a one-chip semi-conductor device in which the constituent elements shown in FIG. 6 except for the second level cache memory 68 and the physical address array 70 are formed in an integrated circuit. In this one-chip device, there is mounted between the data bus D-BUS and the second level cache memory 68 a second level cache memory controller 68A for controlling the cache memory 68. Because the execution or processing unit 68 serving the function of a CPU and the first level cache memory 63 permitting high-speed operation are physically disposed closely to each other and interconnected through semiconductor integration, signal deterioration due to the wiring layer as well as the delay in response can effectively be suppressed. As a result, the processing speed of the multiprocessor system including a number of such processing apparatuses can be increased as a whole, not to mention the increase in efficiency of the invalidation processing. In such structure of the multi-processor system, the data processing interaction between the execution unit 62 serving for the CPU function and the first level cache memory of a high speed is executed in the logical address space, while the data transfer processing between the second level cache memory of an intermediate speed and the data bus connected to the other processing apparatus and the main memory is performed in the physical address space. This is another advantage in the system structurization.

It should be mentioned that the present invention can equally be applied to other structures than that described above as well as other type processing apparatus designed for accessing the cache memory with the logical address having an address space to similar advantageous effects.

As will now be appreciated from the foregoing description, it is possible according to the teachings of the invention provided in the illustrative embodiments described above to speed up the cache memory invalidation processing and enhance the performance of the computer system including a cache memory and a processing apparatus which shares a main memory with the input/output processing unit and other processing apparatus(es), by virtue of such arrangement that the number of times the memory is accessed in the cache memory invalidation processing for altering the contents of the main memory is significantly decreased when compared with the hitherto known scheme.

What is claimed is:

1. An information processing system comprising:

an execution unit;

a first cache memory having entries accessible by a logical address;

a second cache memory having entries accessible by a physical address;

a first address array coupled to said execution unit and said first cache memory and having a logical address area defined by a logical address; and a second address array coupled to said execution unit and said second cache memory and having a physical address area defined by a physical address and a tag area storing translation information for translating the physical address into a logical address.

2. An information processing system according to claim 1, wherein said first address array includes a first control area storing control information indicating the state of entry which is accessed by a logical address of said first cache memory, and said second address array includes a second control area storing control information indicating the state of an entry which is accessed by a physical address of said second cache memory.

3. An information processing system according to claim 2, wherein said first cache memory stores a copy of at least part of information stored in said second cache memory, said second control area is accessed to invalidate an entry of said second cache memory designated by a physical address, the physical address is translated into a logical address, using said translation information, when a copy of information corresponding to said invalidated entry of the second cache memory is present in said first cache memory, and said first control area is accessed to invalidate an entry of said first cache memory designated by said logical address translated.

4. An information processing system as claimed in claim 1, wherein said execution unit, said first cache memory, and said first address array are integrated on a single semiconductor chip.

5. An information processing system as claimed in claim 1, wherein said translation information is used together with predetermined portions of said physical address to generate said logical address for accessing said first cache memory.

* * * * *